US 9,075,826 B2

(12) United States Patent
Shen et al.

(10) Patent No.: US 9,075,826 B2
(45) Date of Patent: Jul. 7, 2015

(54) IMAGE MATCHING

(71) Applicant: Hewlett-Packard Development Company, L.P., Houston, TX (US)

(72) Inventors: Ju Shen, Palo Alto, CA (US); Wai-Tian Tan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 86 days.

(21) Appl. No.: 13/895,500

(22) Filed: May 16, 2013

(65) Prior Publication Data

US 2014/0341475 A1   Nov. 20, 2014

(51) Int. Cl.
G06K 9/00 (2006.01)
G06K 9/68 (2006.01)
H04N 5/228 (2006.01)
G06F 17/30 (2006.01)

(52) U.S. Cl.
CPC .................. *G06F 17/30247* (2013.01)

(58) Field of Classification Search
CPC .................. G06F 17/30265; G06F 17/30241; G06F 17/30256; G06F 17/30244; G06F 17/30253; G06F 17/30867; G06F 17/3087; G06F 17/30879; G06K 9/00832; G06K 9/32; G06K 9/6253; G06K 9/00; G06K 9/00228
USPC ......... 382/154, 100, 165, 162, 181, 209, 212, 382/213, 214, 255, 218; 348/E9.01, 348/E9.001, E9.002, E5.001, E5.062, 348/E5.073, E5.076, 571, E5.055, 207.99, 348/222.1, 241, 607, 240.99
See application file for complete search history.

(56) References Cited

U.S. PATENT DOCUMENTS

| | | | |
|---|---|---|---|
| 6,975,755 B1 * | 12/2005 | Baumberg | 382/154 |
| 8,311,334 B2 | 11/2012 | Guleryuz et al. | |
| 8,385,971 B2 * | 2/2013 | Rhoads et al. | 455/556.1 |
| 8,755,837 B2 * | 6/2014 | Rhoads et al. | 455/556.1 |
| 8,768,313 B2 * | 7/2014 | Rodriguez | 455/414.1 |
| 8,805,110 B2 * | 8/2014 | Rhoads et al. | 382/255 |

OTHER PUBLICATIONS

Ju Shen et al., Image-Based Indoor Place-Finder Using Image to Plane Matching; 2013.
Hyunwoo Kim et al, Wide-Baseline Image Matching Based on Coplanar Line Intersections, The 2010 IEEE/RSJ International Conference on Intelligent Robots and Systems. Oct. 18-22, 2010, Taipei, Taiwan, 8 Pages.
Jun Jiang et al., A 3D Plane Recognition Algorithm Based on Image Matching, 2012 Fifth International Symposium on Computational Intelligence and Design, 4 Pages.

(Continued)

*Primary Examiner* — Sheela Chawan
(74) *Attorney, Agent, or Firm* — Hewlett-Packard Patent Department

(57) ABSTRACT

A method performed by a system. The method includes comparing at least one query image received from a mobile device with a plurality of planes stored in a memory, matching the query image with at least one of the plurality of planes, and determining a location based on the matching of the query image with the at least one plane. Comparing the at least one query image with the plurality of planes includes executing a warping function between the at least one query image and the plurality of planes to determine at least a first matching score for matching the at least one query image with at least one of the plurality of planes.

17 Claims, 8 Drawing Sheets

(56) References Cited

OTHER PUBLICATIONS

Kroepfl, M. et al., Efficiently Locating Photographs in Many Panoramas, (Research Paper), Proceedings of the 18th International Conference on Advances in Geographic Information Systems, Nov. 2-5, 2010, pp. 119-128.

Lowe, D.G. et al. Distinctive Image Features From Scale-invariant Keypoints, (Research Paper), International Journal of Computer Vision, Nov. 2004, pp. 91-110, vol. 60. No. 2.

Wu, C. et al. 3D Model Matching with Viewpoint-invariant Patches (VIP), (Research Paper), IEEE Conference on Computer Vision and Pattern Recognition, Jun. 23-28, 2008, pp. 1-8.

* cited by examiner

IMAGE MATCHING

BACKGROUND

Digital imaging devices and wireless communication technologies have seen dramatic improvements over the past years. Increasing number of today's mobile users carry multiple mobile devices. Various mobile devices such as Internet-enabled tablets, smart phones, and laptops have become essential personal accessories, connecting users to friends, work, and entertainment. These mobile devices have various features, can generate digital images, and can be used for different personal or professional purposes. Users now have more functionality choices and expect to use their mobile devices not only as communication tools but also as data and guidance systems.

DETAILED DESCRIPTION

Figure 1:
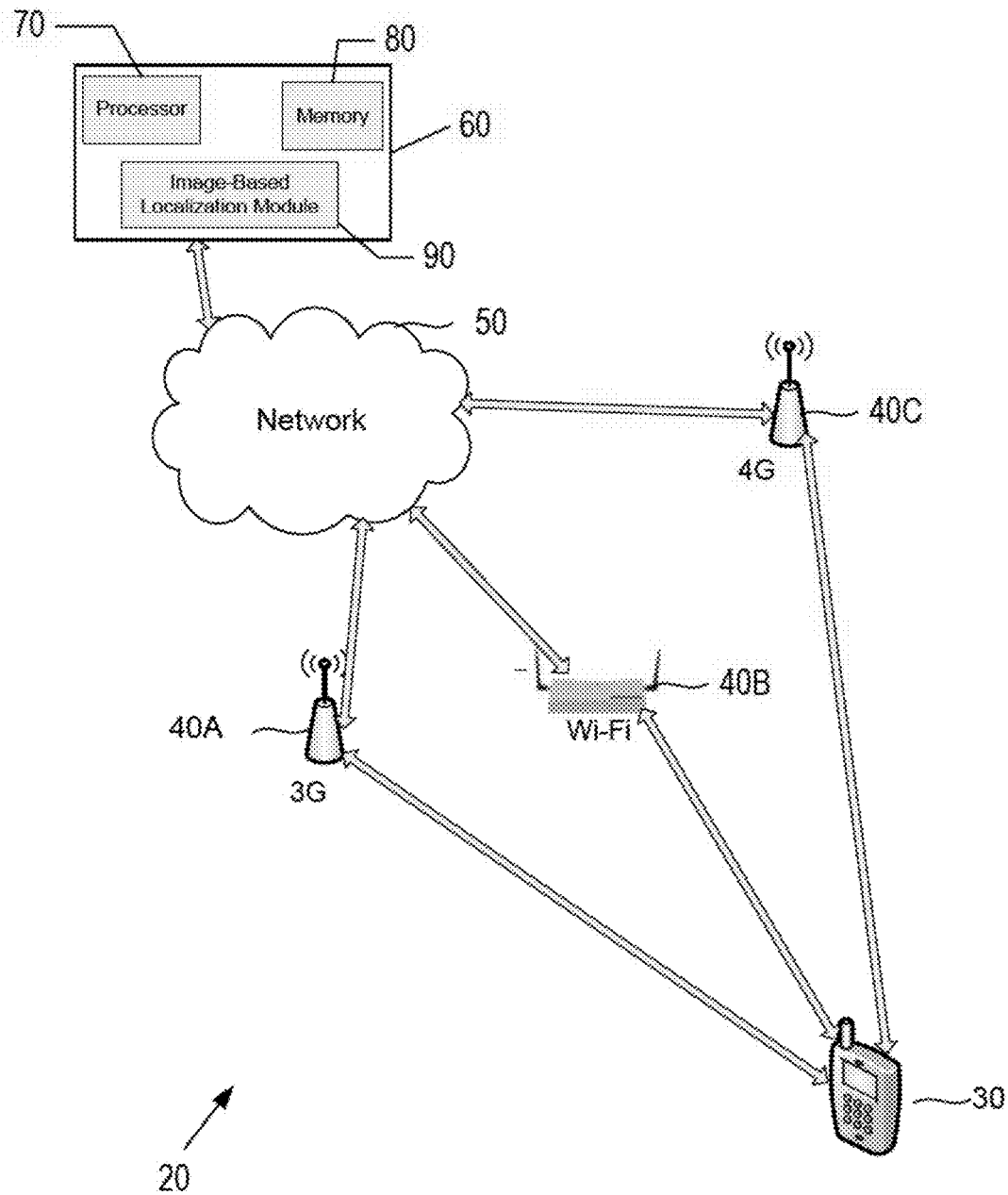
FIG. 1 is a schematic illustration of an example of a system for image-based localization.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the terms "mobile device" and "wireless device" may be used interchangeably and refer to any one of various smart-phones (e.g., iPhone®), cellular telephones, tablets, (e.g., iPAD®), laptop computers, personal data assistants (PDA's), VoIP phones, wireless enabled entertainment systems, and other similar electronic devices that include a processor, a camera, and are capable of sending and receiving images and wireless or wired communication signals.

As used herein, the term "communication interface" refers to various protocols available to any of the wireless devices to communicate with each other and with a network. In particular, the communications interface may include Wi-Fi, Bluetooth, 3G, 4G, and any other comparable communications interfaces.

As used herein, the term automatically refers to acting or operating in a manner essentially independent of external human influence or control. A system or an element of a system may have the capability to start, operate, perform functions, etc., independently of specific requests or regulations.

As used herein, the term plane refers to a planar region or a surface in an imaged area (e.g., a scene) of an indoor environment. The planes are constructed or determined from a plurality of images or maps by using different imaging techniques and methods. The images used to construct the planes correspond to a specific location (e.g., a scene such as a meeting room, cubicle area, corridor, class room, etc.) of an environment (e.g., office building, college building or complex, etc.). Therefore, each plane is associated with a specific image location in the environment. As described in additional detail below, plurality of planes from a plurality of images are collected and stored in a memory. In some examples, the planes are stored with at least image texture information and plane location information (i.e., coordinates of the plane in the imaged environment).

As used herein, the terms "pixel domain validation" or "pixel domain validation analysis" may be used interchangeably and refer to directly comparing the image texture of a query image generated by a mobile device with the image texture of at least one of plane selected from a plurality of planes stored in a memory. In some examples, directly comparing the image texture of a query image with the image texture of at least one plane includes taking in consideration possible color and intensity changes of the query image and the plane, viewpoint, and camera specifications.

With the improvements in digital imaging devices and wireless communication technologies, many users of mobile devices expect to utilize their mobile devices to immediately determine a location (e.g., indoor or outdoor) in an environment. One option that can be offered to such users is finding a location based on a photo (i.e., a digital image, also called a query image in this description) captured with the mobile device. This process is also called image-based localization. While the methods and systems discussed herein primarily describes indoor image-based localization, the methods can be also applied for determining an outdoor location. Finding indoor location by using an image captured with a mobile device can be both faster and more accurate than common localization methods based on Wi-Fi and magnetic fields. While a picture can be taken instantly, Wi-Fi and magnetic field based methods typically require a warm-up period before accuracy can be established. From a deployment perspective, integrated cameras are universal in mobile devices and typically have a general application programming interface ("API") that works across different manufacturers or wireless providers. In contrast, compasses are not universal in mobile devices and are rarely present in laptops. There is no general API to access low-level Wi-Fi information for accurate location computation.

Nonetheless, there are two fundamental challenges in image-based localization based on an image captured with a mobile device. First, indoor environments are often designed to have similar appearances (e.g., cubicle areas in offices). This means that highly discriminating algorithms are required to determine indoor location. Second, when an image based method for determining indoor location is used, a picture can be taken from an arbitrary camera pose and focal length. When those parameters are known or can be estimated, it is generally computationally feasible to infer a location from a three dimensional ("3D") model of an earlier-captured environment. However, it is generally very difficult or not possible to determine camera pose and focal length parameters from a single picture that generally is a two dimensional ("2D") image.

This description is directed to systems, methods, and machine-readable storage medium for determining a location based on a captured query image from a mobile device (i.e., image-based localization method). The proposed systems and methods support accurate image-based localization when camera pose and focal length information is not available. In particular, the description proposes a system to capture different locations (corridors, meeting rooms, lounges, etc.) of various environments (i.e., buildings, etc.) that will be searched by using a collection of planar surfaces (i.e., planes) that are associated with a specific location (i.e., specific meeting room, portion of a corridor, etc.) in an environment. A database is created that includes a plurality of planes that are generated from a plurality of images. As described in additional detail below, the images can be captured and processed to retrieve the planes, or the planes can be retrieved from detailed figures representing specific indoor environment (e.g., building plans, construction plans, etc.)

In one example, the proposed method is performed by a system and includes comparing at least one query image received from a mobile device with a plurality of planes stored in a memory. The planes are generated from a plurality of images corresponding to locations in an environment and each plane is associated with a location in the environment. Comparing the at least one query image with the plurality of planes includes executing a warping function between the at least one query image and the plurality of planes. In some examples, executing the warping function includes geometric analysis of matching feature descriptors between the at least one query image and the plurality of planes to determine a matching score for matching the at least one query image with at least one of the plurality of planes. The warping function can involve warping (i.e., transforming) either the query image or selected matching planes using a 3×3 homography matrix to compare the planes from the memory with portions of the query image and to determine a matching score. The method further includes matching the query image with at least one of the plurality of planes, and determining a location based on the matching of the query image with the at least one plane. Additionally, comparing the at least one query image with the plurality of planes can further include performing pixel domain validation analysis.

The proposed methods and systems rely on using extracted planes of the environment to determine a location based on an image captured with a mobile device. Because indoor environments typically contain an abundance of planes, these methods introduce several advantages. For example, the methods can accurately determine indoor location (e.g., meeting room, cubicle, etc.) without using any non-planar structure in their analysis. Further, considering that the camera pose and the focal length of the mobile device generating the image are fixed but generally unknown, the proposed methods execute a warping function that includes geometric analysis of matching feature descriptors between the image from the mobile device and the plurality of planes to determine a location. Since all points on a 3D plane are related to pixels in a query image through a single 3×3 homography matrix, the methods can use many points to reliably estimate projection matrix of a plane and to match it to an image from a mobile device to determine a location.

FIG. 1 is a schematic illustration of an example of a system 20 for image-based localization based on an image captured with a mobile device. The system 20 includes at least one mobile devices 30, at least one wireless access points 40 (three wireless access points 40A-C are illustrated in FIG. 1) connected to the mobile devices 30 and to a network 50, and a computing device 60. The computing device 60 is in communication with the wireless devices 30 via the network 50 and the access points 40A-C. In one example, the computing device includes a processor 70, a memory 80, and an image-based localization module 90 that determines a location based on a query image according to the proposed method.

The mobile device 30 belongs to and is operated by a user (not shown) to allow the user to communicate with other users and/or to perform image-based localization via the device 30. In the illustrated example, the mobile device 30 is a smart phone. However, the mobile device 30 may also include a tablet, a laptop computer, or any other mobile device that includes a camera and can generate images. In alternative examples, the user can own or operate more than one mobile device and can decide which device to use to perform image-based localization. The mobile device 30 includes a camera (not shown) that is operable to capture images and send them to the computer 60 via the network 50. Further, the mobile device 30 includes at least one communication interface that is used to connect with the other mobile devices or to the network 50. The communication interfaces of the mobile device 30 may include a Wi-FI interface, a Bluetooth interface, a 3G interface, a 4G interface, a near filed communication (NFC) interface, and any other suitable interface.

The wireless access points 40A-C may include any type of access point that allows a communication between the mobile device 30 and the network 50. In the illustrated example, the wireless access points of the system 20 include a 3G tower 40A, a Wi-FI access point 40B, and a 4G tower 40C. In alternative examples, the system 20 can include other suitable access points. Each access point 40 has an associated coverage area (not shown). It is to be understood that the various access points may have different power levels, and consequently may have different coverage areas.

The network 50 is configured to connect the computing device 60 and the mobile device 30 so the device 30 can transmit query images (not shown) to the computing device 60 and the computing device 60 can transmit signals and information to the mobile devices 30 via the cloud. The network 50 may include any suitable type or configuration of network to allow the computing device 60 to communicate with the mobile device 30 or other wireless devices (not shown). For example, the network 50 may include wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 50 can further include a local area network ("LAN"), a neighborhood area network ("NAN"), a home area network ("HAN"), a personal area network ("PAN"), a public switched telephone network ("PSTN"), an Intranet, the Internet, or any other suitable network.

The computing device 60 provides functionality to perform image-based localization based on a query image sent from the mobile device 30 to the computing device 60. As described in additional detail below, in one example, the computing device 60 compares at least one image received from the mobile device 30 to a plurality of planes that are stored in a memory. Alternatively, the query image may be acquired by the mobile device 30 and may be sent to the computing device 60 via another device or system in the cloud. The planes are associated with different locations (e.g., meeting rooms, cubicle areas, corridors, class rooms, etc.) of an indoor environment (e.g., office building or complex, college building or complex, etc.). Using a warping function and a pixel domain validation analysis, the computing device 60 matches the query image with at least one of the plurality of planes to determine a location of the user sending the image based on the matching of the query image with the at least one plane.

Figure 2A:
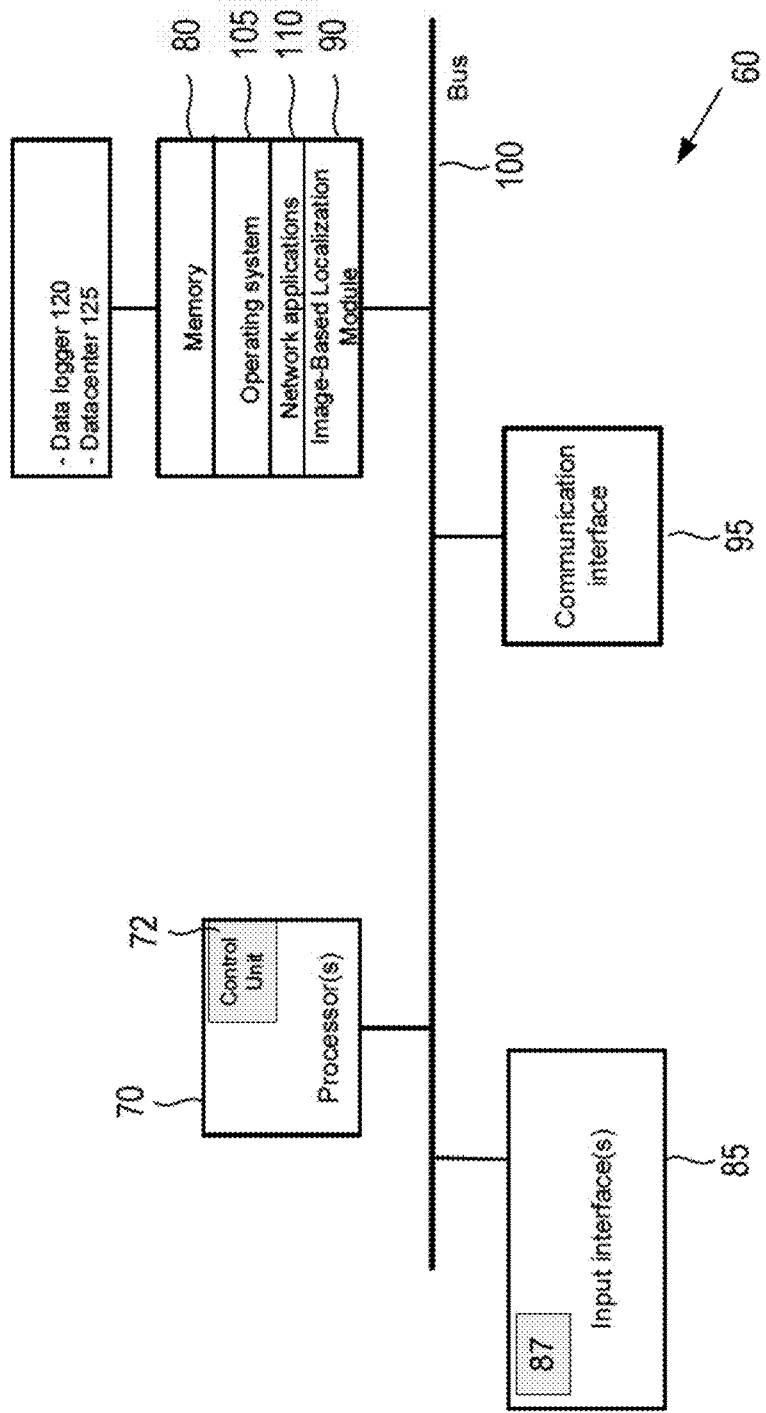
FIG. 2A shows a schematic representation showing an example of a computing device of the system of FIG. 1.

FIG. 2A shows a schematic representation of the computing device 60 of the system 20. The computing device 60 can be a server, a desktop computer, a laptop, or any other suitable device configured to carry out image-based localization. The computing device 60 can an independent device or can be integrated in the mobile device 30. The computing device 60 includes a processor 70 (e.g., a central processing unit, a microprocessor, a microcontroller, or another suitable programmable device), a memory 80, input interfaces 85, and a communication interface 95. Each of these components is operatively coupled to a bus 100. For example, the bus 100 can be an EISA, a PCI, a USB, a FireWire, a NuBus, or a PDS. In other examples, the computing device 60 includes additional, fewer, or different components for carrying out similar functionality described herein.

The communication interface 95 enables the computing device 60 and the system 20 to communicate with a plurality of networks. The input interfaces 85 can process content (e.g., images) from the mobile device 30 or another external device/system. In one example, the input interfaces include 85 at least a media interface 87. In other examples, the input interface can include additional interfaces. The media interface 87 receives media input (e.g., a query image) from a mobile device (e.g., the mobile device 30) or another system, and can include, for example, a connector interface, a storage device interface, or a local or wireless communication port which receives the media input from the mobile device. In addition to the query image from the mobile device 30, the media input may include, for example, a document, a video, a slide show or presentation, or other media content. For example, media input from other devices/systems can be used to create or supplement a plane database stored in the memory 80.

The processor 70 includes a control unit 72 and may be implemented using any suitable type of processing system where at least one processor is configured to execute computer-readable instructions stored in the memory 80. The memory 80 includes any suitable type, number, and configuration of volatile or non-transitory machine-readable storage media configured to store instructions and data. Examples of machine-readable storage media in the memory 80 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices. The memory 80 may also be used for storing temporary variables or other intermediate information during execution of instructions to be executed by processor 70.

The memory 80 may also store an operating system 105, such as Mac OS, MS Windows, Unix, or Linux; network applications 110; and various modules (e.g., an image-based localization module 90). The operating system 105 can be multi-user, multiprocessing, multitasking, multithreading, and real-time. The operating system 105 can also perform basic tasks such as recognizing input from input devices, such as a keyboard, a keypad, or a mouse; sending output to a projector and a camera; keeping track of files and directories on medium 80; controlling peripheral devices, such as disk drives, printers, image capture device; and managing traffic on the bus 100. The network applications 110 include various components for establishing and maintaining network connections, such as computer-readable instructions for implementing communication protocols including TCP/IP, HTTP, Ethernet, USB, and FireWire.

The machine-readable storage media are considered to be an article of manufacture or part of an article of manufacture. An article of manufacture refers to a manufactured component. Software stored on the machine-readable storage media and executed by the processor 70 includes, for example, firmware, applications, program data, filters, rules, program modules, and other executable instructions. The control unit 72 is configured to retrieve from the machine-readable storage media and execute, among other things, instructions related to the control processes and methods described herein.

Figure 2B:
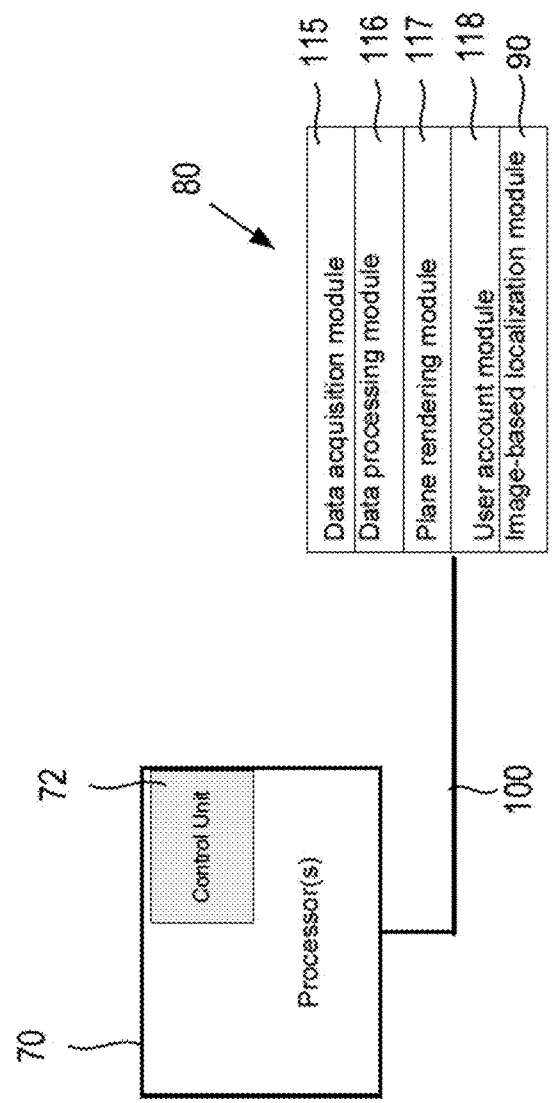
FIG. 2B is a schematic illustration showing an example of a machine-readable storage medium encoded with instructions executable by the processor of the computing device of FIG. 2A.

FIG. 2B illustrates an example of the machine-readable storage medium 80 encoded with instructions executable by the processor of the system 20. In one example, the machine-readable storage medium includes a data acquisition module ("DAQ") 115, a data processing module 116, a plane rendering module 117, a user account module 118, and the images-based localization module 90. In other examples, the machine-readable storage medium can include more or less module.

In one example, the user account module 116 provides instructions that allow a user to register the mobile device 30 and any other mobile devices with the system 20. That way, the system 20 recognizes devises 30 that belong to the same user and can determine a location of the user based on an image sent by one of the mobile devices at any given time. During his or her first use of the system 20, a user creates a user account (i.e., a profile) by providing personal information to the system 20 via a user interface (not shown). A user may enter the information via the user interface of the mobile devices 30 or a user interface connected to the computing device 60. After creating an account, the user registers the at least one mobile device associated with that user by providing information about the device and the user (e.g., preferred locations, favorite environments, etc.). At any time, the user can update his or her account by adding or removing devices 30. It is to be understood that the systems and methods described herein may be configured to determine location based on a query image without a user registration of the mobile device 30.

As explained in additional details below, the image-based localization module 90 provides various computer-readable instruction components for comparing at least one query image received from the mobile device 30 with a plurality of planes stored in the memory 80, matching the query image with at least one of the plurality of planes, and determining a location based on the matching of the query image with the at least one plane.

Information and data associated with the system 20, the wireless device 30, and other systems/devices can be stored, logged, processed, and analyzed to implement the control methods and processes described herein. In addition to the data acquisition module 115, the memory 80 includes a data logger or recorder 120 and a datacenter 125. The DAQ module 115 is configured to receive information or data from various external devices or systems. In one example, the DAQ module 115 receives or acquires images or planes associated with specific locations (e.g., hallways, meeting rooms, cubicle areas, etc.) of indoor environments (e.g., office buildings, school buildings, hotels, etc.). The DAQ module 115 can receive a plurality of images captured from multiple depth cameras that include details of the specific indoor environment.

Figure 3:
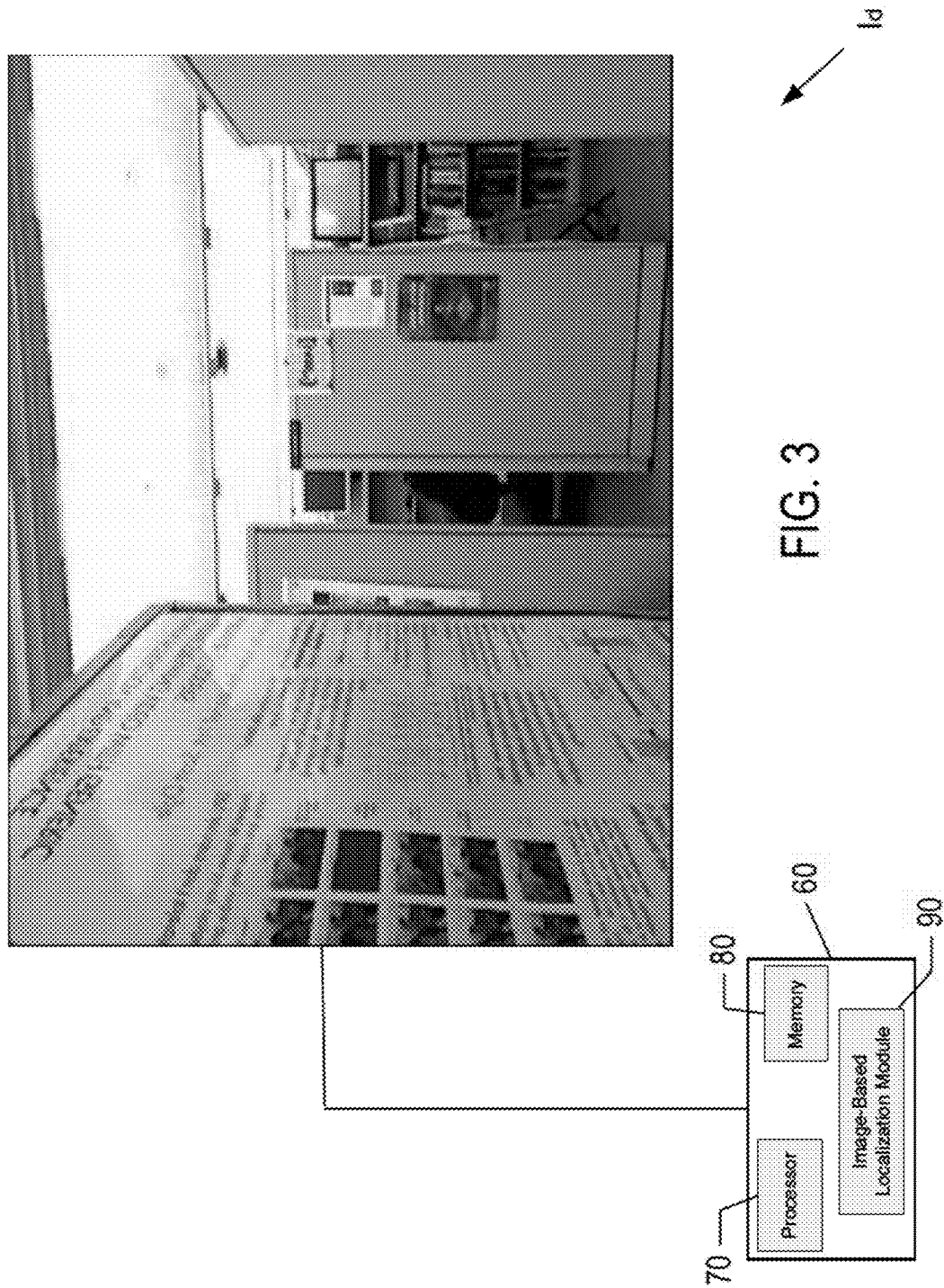
FIG. 3 illustrates an example of a RGB image taken with a camera and processed by the computing device of FIG. 2A.

FIG. 3 illustrates an example of a RGB image Id taken with a camera and transferred to the DAQ module 115 for processing by the computing device 60. In one example, the DAQ module 115 can receive a plurality of sequential images that capture portions or areas (i.e., scenes) of a specific indoor environment (e.g., building floors, rooms, cubicle areas, etc.) by using a vendor who generates the images of the indoor environment. Thus, each of the captured images corresponds to a location in the indoor environment. These images can be sent directly to the DAQ module 115 by the depth cameras or by an external computer or a system. In another example, the DAQ module 115 can receive detailed building plans (e.g., CAD drawings) from an external computer or a system. The building plans also correspond to specific locations in the building. As explained in additional detail below, the computing device 60 can process the received images or building plans (e.g., by using the data processing module 116) to generate a plurality of planes associated with specific image or plan locations of the indoor environment. Alternatively, the DAQ module 115 can directly receive planes associated with specific locations of the indoor environments. The planes may be extracted from images generated with depth cameras that are processed by external computers or systems. In addition, the DAQ module 115 receives or acquires a map (e.g., a floor map, not shown) of the specific indoor environment, where every received image corresponds with a location on the map and every plane location is associated with the image location on the map.

The information gathered by the DAQ module 115 is provided to the data logger or recorder 120. The data logger or recorder 120 is configured to store the information (e.g., images, planes, building plans, maps, etc.) in the datacenter 125 for further storage and processing. In one example, the datacenter 125 is included in the memory 80 of the computing device 60. In another example, the datacenter 125 is a remote datacenter (i.e., not located in the computer 60). In that example, the data logger or recorder 120 provides the information through a network (e.g., the network 50) to the datacenter 125.

Figure 4:
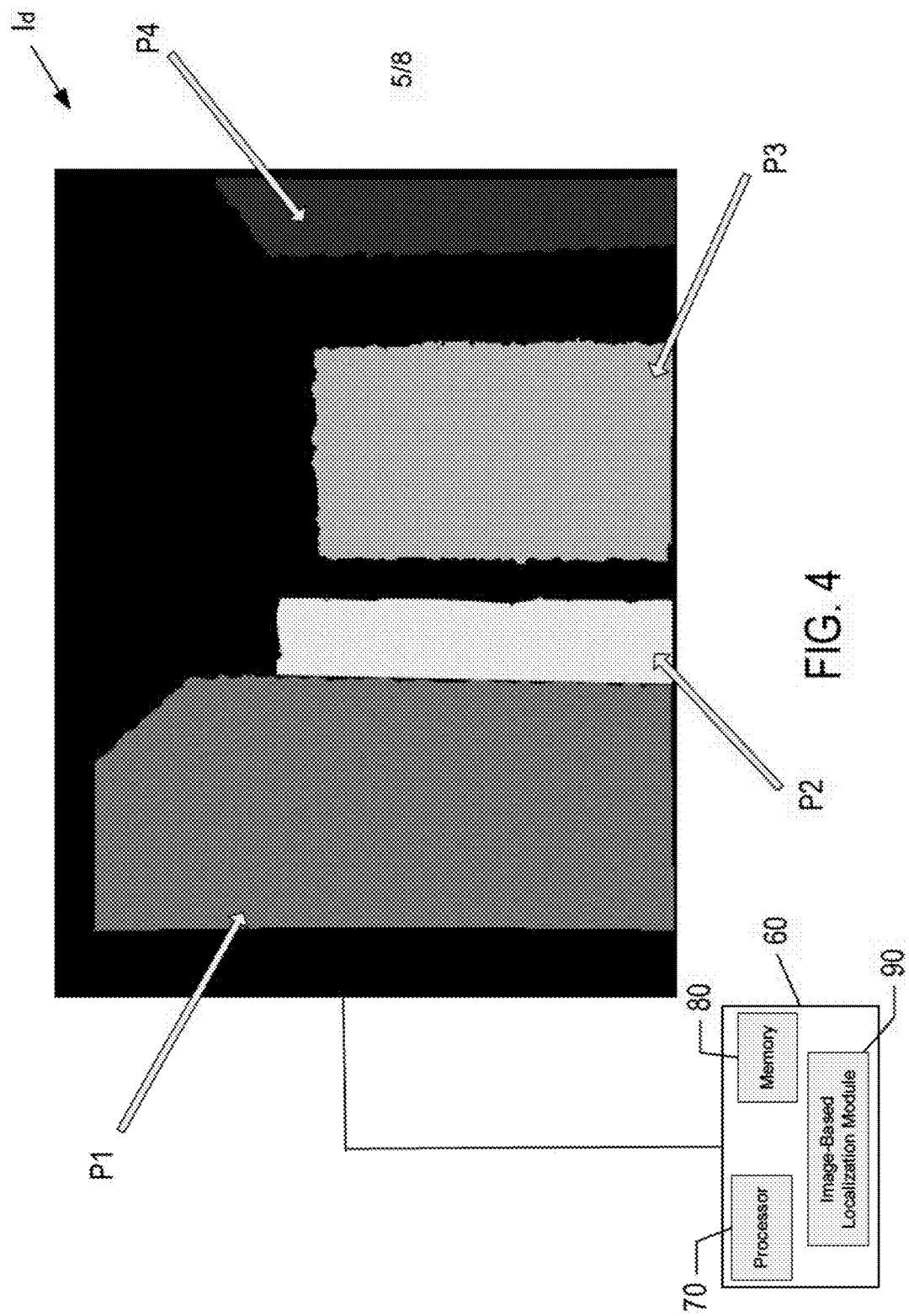
FIG. 4 shows an example of the RGB image of FIG. 3 processed by the computing device of FIG. 2A, where the image includes a plurality of planes.

FIG. 4 shows an example of the image Id processed by the computing device 60, where the image includes a plurality of planes P1-P4. In one example, the computing device 60 processes the image or the building plan by using the data processing module 116. When the computing device 60 receives images or building plans, the processor 70 constructs or determines a plurality of planes based on the received images or building plans (e.g., by using the plane rendering module 117). Each plane is associated with an image location on the map of the particular environment (i.e., building). Each of the received images Id can be a 3D image that includes image texture and depth information. In one example, the control unit 72 of the processor 70 processes each depth image Id as follows.

First, the control unit 72 detects all possible lines or straight edges of planes in the received depth image (e.g., by applying a Canny Edge Detector and using a Progressive Probabilistic Hough Transform). Next, the control unit 72 traverses all line pairs (e.g., by using a J-linkage algorithm) to determine if a line joining the mid-point of the two edges lies on a plane. By using the plane rendering module 117, the control unit 72 then constructs planes for each possible line pairs and merges all possible planes in an image. As shown in FIG. 4, in some examples, at least one or a plurality of planes can be constructed from a single image. Alternatively, where an image does not include planes, the control unit does not construct any planes. As mentioned above, each plane is associated with a specific location (e.g., cubicle area, corridor, rooms, etc.) of the indoor environment (e.g., building, etc.) and that location can be later provided to a user based on a comparison between a captured query image and the stored planes.

The plurality of planes P is stored in the datacenter 125 to form a plane database. The maps for the plurality of environments are also stored in the datacenter 125. Since every depth image Id is segmented into planar regions $\{R1, R2, \ldots, Ri\}$, the corresponding planes $\{P1, P2, \ldots, Pi\}$ for each image Id include the following information:

$$P_i = \{I_c^{(i)}, f_*^{(i)}, x_*^{(i)}, loc^{(i)}\} \quad (1)$$

where $I_c^{(i)}$ is the corresponding image texture of the region Ri, $f_*^{(i)}$ is a list of features descriptors in the image texture $I_c^{(i)}$, $x_*^{(i)}$ is a list of 2D homogeneous coordinates for each descriptor in $f_*^{(i)}$, and $loc^{(i)}$ is the location of the region Ri in the map for the specific environment (e.g., office building, etc.). Therefore, each plane P (regardless whether is directly received by the system or constructed by the processor) is stored in the datacenter 125 with at least image texture information and plane location information (i.e., coordinates defining the location of the plane). From the image texture $I_c^{(i)}$ the control unit 72 can determine the feature descriptors for each plane or region. Various methods can be used to determine the local feature descriptors. In addition, the control unit can organize the determined feature descriptors for each plane into k-d trees.

Therefore, the information and data stored in the datacenter 125 can be accessed by the computing device 60 for processing and analysis. For example, the computing device 60 is configured to process and analyze the planes stored in the datacenter 125 to determine a location of a user based on at least one query image acquired by the user's mobile device 30. In one example, the mobile device 30 directly sends the query image to the computing device 60. Alternatively, the mobile device 30 may acquire the image and the image may be sent to the computing device 60 via another system.

As noted above, the control unit 72 is configured to retrieve from the machine-readable storage media and execute, among other things, instructions related to the control processes and methods described herein. When executed, the instructions cause the control unit 72 to construct a plurality of planes for a plurality of images and to store the planes in the memory 80. Further, the instructions cause the control unit 72 to process a query image received from the mobile device 30 and to identify feature descriptors of the query image. In addition, the instructions cause the control unit 72 to compare the query image with the plurality of planes by using geometric analysis of matching feature descriptors between the query image and the plurality of planes and to compute a matching score to match the query image with at least one of the plurality of planes by performing pixel domain validation. Finally, instructions cause the control unit 72 to determine a location based on the highest matching score.

The following paragraphs describe methods for determining a location based on an image generated by a mobile device, the method being performed by the processor 70 of the computing device 60. The proposed methods assist users with accurate image-based localization and allow them to immediately determine their indoor location by using the camera of their mobile devices.

Figure 5:
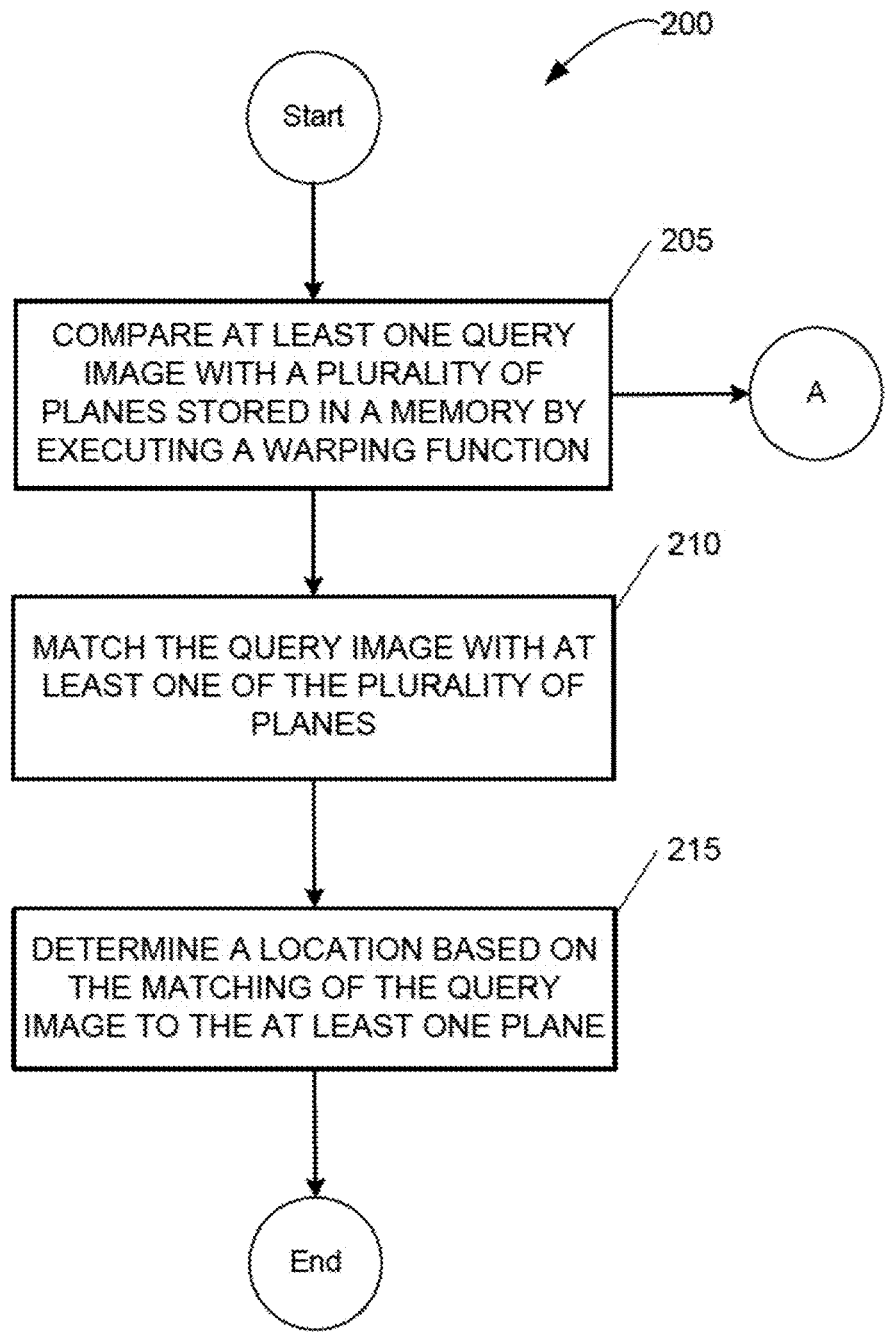
FIG. 5 illustrates a flow chart showing an example of a method for determining a location.

FIG. 5 illustrates a flow chart showing an example of a method 200 for determining a location based on a query image captured with a mobile device (i.e., image-based localization). The method 200 can be executed by the control unit 72 of the processor 70. Various steps described herein with respect to the method 200 are capable of being executed simultaneously, in parallel, or in an order that differs from the illustrated serial manner of execution. The method 200 is also capable of being executed using additional or fewer steps than are shown in the illustrated example.

The method 200 may be executed in the form of instructions encoded on a non-transitory machine-readable storage medium executable by the processor 70. In one example, the instructions for the method 200 are stored in the image-based localization module 90.

The method 200 begins in step 205, where the control unit 72 compares at least one query image Iq received from a mobile device with a plurality of planes stored in the memory 80. As noted above, the plurality of planes can be generated or constructed from a plurality of images and each plane is associated with an image location in the indoor environment. In one example, comparing the at least one query image Iq with the plurality of planes includes executing a warping function between the at least one query image and the plurality of planes. Executing the warping function involves geometric analysis of matching feature descriptors.

Further, comparing the at least one query image Iq with the plurality of planes may also include performing pixel domain validation analysis. As mentioned above, the computing device 60 can receive at least one image captured with the mobile device 30. For instance, when a user walks into a large office or university campus and she wants to determine her exact location, the user may take a photo with her mobile device 30 (e.g., a smart phone, tablet, etc.) and use the photo to perform image-based localization.

Next, at step 210, the control unit 72 matches the query image Iq with at least one of the plurality of planes. In one example, matching of the query image with at least one of the plurality of planes includes determining at least one matching score based on the warping function (i.e., on the geometric analysis of the matching feature descriptors) and the pixel domain validation analysis. Finally, at step 215, the control unit 72 determines a location based on the matching of the query image with the at least one plane. In one example, the control unit selects a plane with the highest matching score to determine the location.

Figure 6:
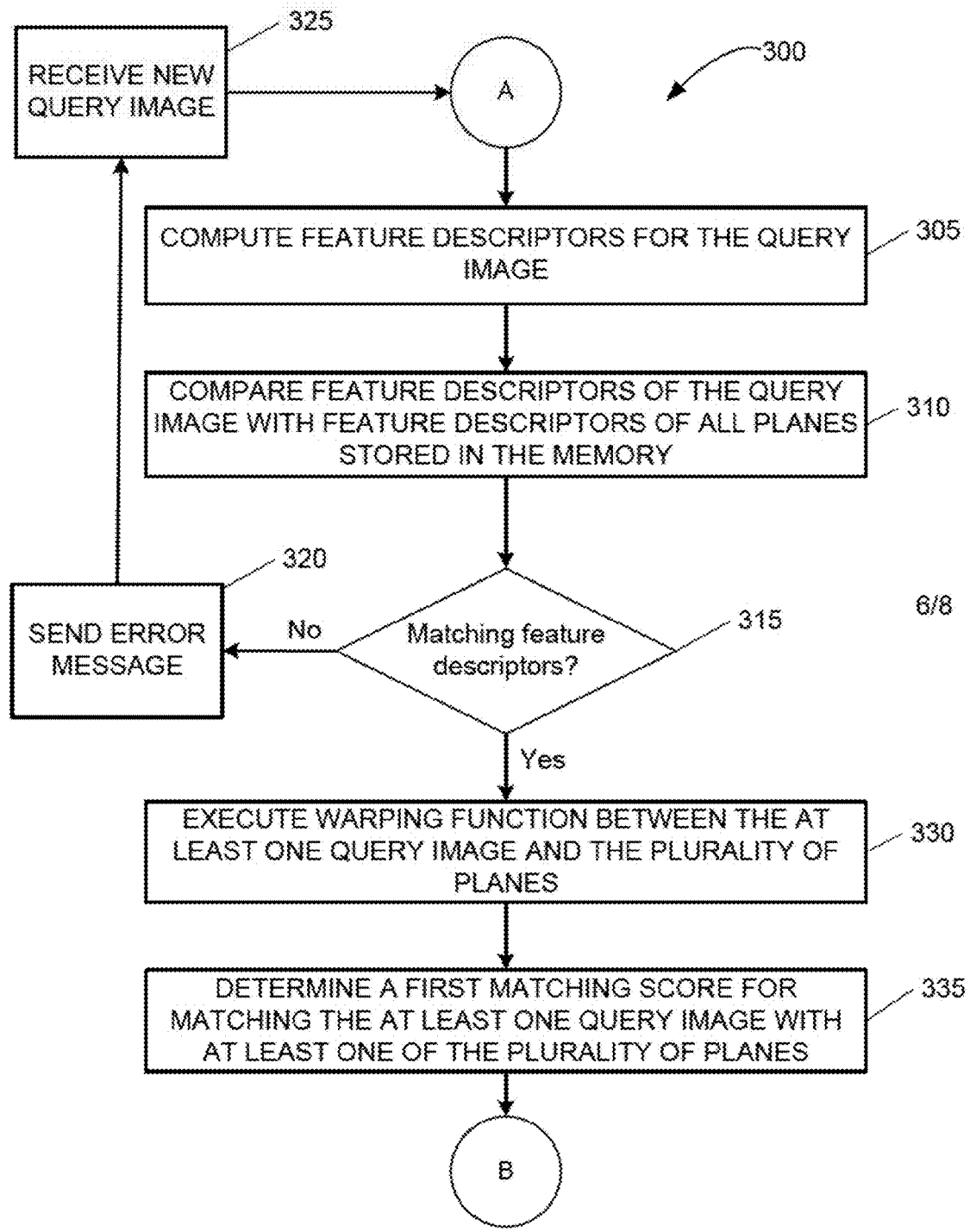
FIGS. 6 and 7 are flow charts illustrating an example of a method for comparing at least one query image received from a mobile device with a plurality of planes stored in a memory.
Figure 7:
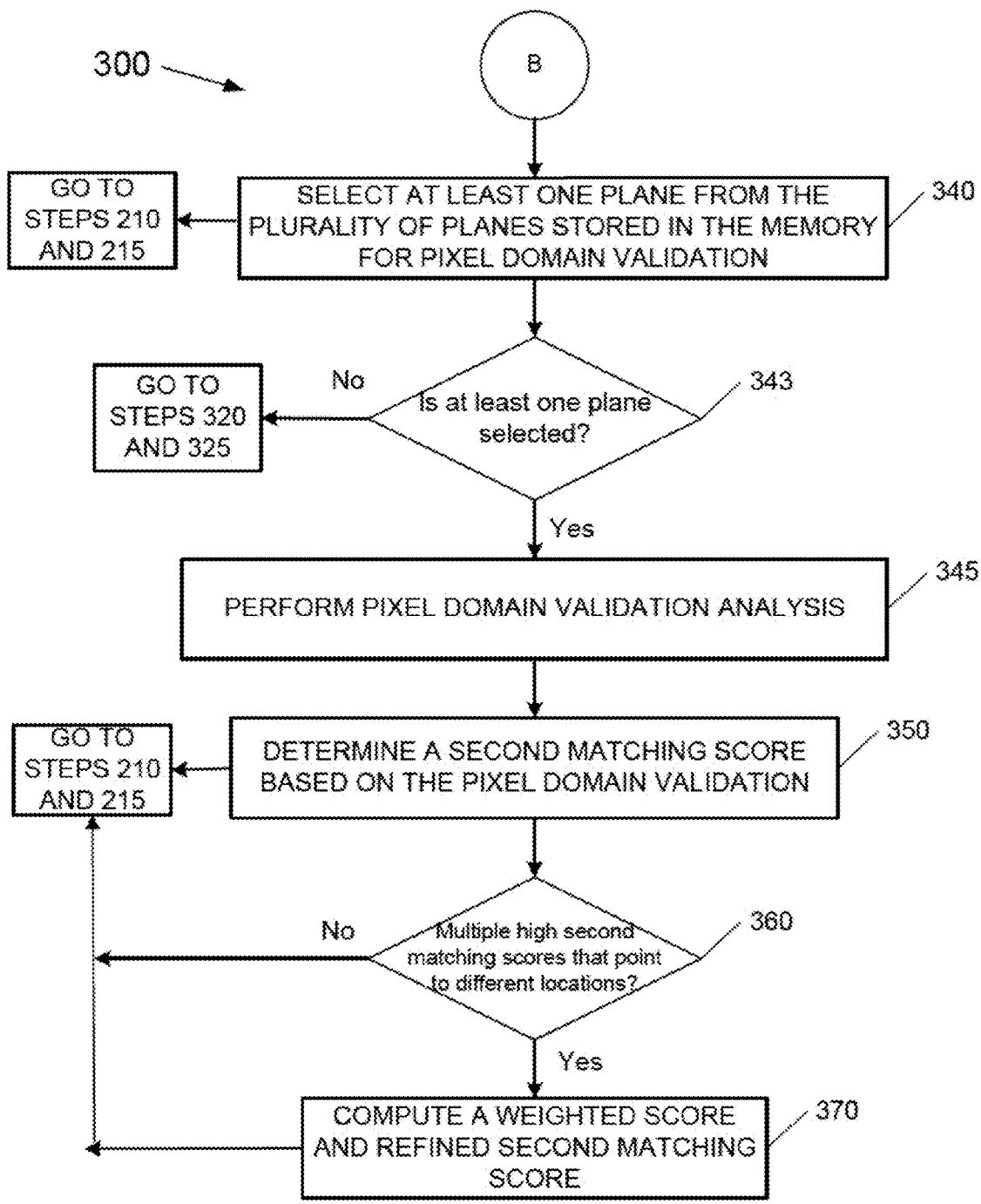

FIGS. 6 and 7 illustrate a flow chart showing an example of a method 300 for comparing the at least one query image received from the mobile device 30 with the plurality of planes stored in the memory 80. The method 300 can be executed by the control unit 72 of the processor 70 and instructions for the method 300 can be stored in the image-based localization module 90. Various steps described herein with respect to the method 300 are capable of being executed simultaneously, in parallel, or in an order that differs from the illustrated serial manner of execution. The method 300 is also capable of being executed using additional or fewer steps than are shown in the illustrated example.

During the execution of the method 300, the query image Iq is compared to all planes stored in the datacenter 125. First, in step 305, the control unit 72 computes or identifies feature descriptors $\{f_1^q, f_2^q, \ldots, f_n^q\}$ for the query image Iq, where the feature descriptors are identified as $f_*^q$. The control unit 72 can use various different algorithms or processes (e.g., scale-invariant feature transform ("SIFT"), speeded up robust features ("SURF"), etc.) to compute the feature descriptors J of the query image Iq. Next, in step 310, the control unit 72 compares the feature descriptors $f_*^q$ of the query image Iq with the feature descriptors for all planes stored in the datacenter 125 (e.g., by using the Best-bin-first algorithm or another available algorithm). In step 315, the control unit 72 determines if there are any matching feature descriptors between the query image and the stored planes. If there are no matching feature descriptors, at step 320, the control unit 72 sends an error message to the user (e.g., "No location found," etc.). Then, the user takes another query image and the computing device 70 receives the new query image (at step 325).

If the control unit 72 determines that there are matching feature descriptors between the query image and the planes stored in the memory, the control unit executes a warping function between the at least one query image and the plurality of planes (at step 330). In one example, executing the warping function includes geometric analysis of matching feature descriptors between the at least one query image and the plurality of planes to determine a first matching score for matching the at least one query image with at least one of the plurality of planes. By initially determining whether there are matching feature descriptors between the query image and the plurality of planes (steps 310 and 315), the method 300 removes unnecessary data (i.e., feature descriptors) to be analyzed in the geometric analysis of matching descriptors (at step 330).

In one example, the control unit 72 performs the warping function between the at least one query image and the plurality of planes as follows. The control unit 72 first stores the correspondent list of matching descriptors as a set of vectors $C=\{(c_{s1}^q, c_{t1}^{(i)}), (c_{s2}^q, c_{t2}^{(i)}), \ldots (c_{sm}^q, c_{tm}^{(i)})\}$, where $c_{s*}^q \in f_*^q$ and $c_t^{(i)} \in f_*^i$. Since the feature descriptors in the plane Pi are coplanar, the corresponding $c_{si}^q$ and $c_{ti}^{(i)}$ should be related by a 3×3 homography matrix $H_0$, which is determined by the warping function (e.g., random sample consensus ("RANSAC") or another similar function).

In other words, instead of independently matching all feature descriptors between the query image and the plurality of planes and counting the number of matches, the control unit 72 executes a warping function that involves geometric analysis of the matching feature descriptors (determined at steps 310 and 315) between the query image and the plurality of planes. Specifically, the control unit warps (i.e., transforms) either the query image or the selected matching planes using a 3×3 homography matrix $H_0$ to compare the planes from the memory 80 with portions of the query image (which may include more than one planes) and to determine a first matching score (at step 335). The first matching score matches the at least one query image with at least one of the plurality of planes.

By using the warping function, the control unit 72 performs geometric analysis of the matching feature descriptors between the query image and the plurality of planes (i.e., when either the query image or the planes are warped) by comparing not only the matching feature descriptors but also the distance between these feature descriptors to determine the first matching score. Thus, the first matching score represents the number of aligned pairs of feature descriptors between the query image and the least one plane (or a plurality of planes where applicable) and the distance between the aligned feature descriptors. As a result, at step 340, the control unit 72 selects at least one plane from the plurality of planes stored in the memory for pixel domain validation analysis based on the geometric analysis of the matching feature descriptors (i.e., based on the first matching score). In other words, the control unit selects 72 planes (at least one, but possibly more than one) that have the highest first matching score for further analysis (e.g., pixel domain validation analysis). As described below, it is also possible that there are planes that match the query image based on the geometric analysis of the matching feature descriptors.

In one example, the first matching score is calculated as follows. As noted above, the first matching score is determined based on aligned (i.e., matching) pairs of feature descriptors between the query image and the plurality of planes and the calculated distance between the matching pairs. Ideally, matching pairs of feature descriptors between the query image and a plane should align perfectly after warping either the plane or the image. However, in practice, there are some misalignments between the warped images. The number of feature descriptor pairs that conforms to the planar assumption after warping can be computed as the number of pairs with dissimilarity score $g_u$ less than a threshold $T_g$, where $g_u$ is given by the maximum error when feature descriptor in one perspective is projected onto a different perspective. The following formula is used to calculate the dissimilarity score $g_u$:

$$g_u = \max(|H_0 x_{s_u}^q - x_{t_u}^{(i)}|, |x_{s_u}^q - H_0^{-1} x_{t_u}^{(i)}|) \quad (2)$$

where $x_{su}^q$ and $x_{tu}^i$ are the homogeneous coordinates of the feature descriptors $c_{su}^q$ and $c_{t*}^{(i)}$ on their associated images, respectively. Further, |.| represents the Euclidean distance between the matching feature descriptor pairs of the query image and the plane. Therefore, formula (2) proposes warping the query image to a plane and checking the misalignment distance, and warping the plane to the query image and again checking the misalignment distance. After that, the larger misalignment between the plane and the query image is selected as the dissimilarity score for that plane. When the false matches are removed, an updated homography matrix H is obtained using the remaining correspondence pairs of feature descriptors. Therefore, the method 300 creates a refined list of planes that is selected for pixel domain validation analysis.

In step 343, the control unit 72 determines if at least one plane is selected for pixel domain validation analysis. If no planes were selected for pixel domain validation analysis based on the geometric analysis of the matching feature descriptors (i.e., on the first matching score), the control unit performs steps 320 and 325. On the other hand, if at least one plane from the plurality of planes stored in the memory is selected based on the geometric analysis of the matching feature descriptors, the control unit 72 performs pixel domain validation analysis on the at least one plane (or a plurality of planes where more than one is selected).

In one example, the control panel 72 can determine location based on the query image only by executing the warping function and performing geometric analysis of matching feature descriptors between the at least one query image and the plurality of planes. In other words, the first matching score may be sufficient to match the query image to at least one of the planes and to determine a location based on the plane location (steps 210 and 215). For example, the control unit 72 can select the plane with the highest first matching score from the plurality of analyzed planes to determine a location of the user. As noted above, each plane has a plane location that is associated with a specific location in the indoor environment. By selecting a matching plane, the control unit 72 can retrieve the plane location from the memory 80 and can send the location to the user's mobile device 30 (e.g., as a portion of the building's map pointing to the specific location of the plane in the building). In the described situation, the control unit 72 may not perform pixel domain validation analysis of the planes selected based on the first matching score.

In other examples, at step 345, the method 300 continues with performing pixel domain validation analysis of the planes selected based on the geometric analysis of matching feature descriptors (i.e., based on the first matching score). Pixel domain validation analysis can include directly comparing the image texture of the query image generated by the mobile device 30 with the image texture of the plane selected based on the geometric analysis of the matching feature descriptors. In some examples, directly comparing the image texture a query image with the image texture of at least one plane includes considering possible color and intensity changes of the query image and the plane, viewpoint, and camera specifications.

Instead of using the number of matching feature descriptor pairs to compare the selected planes with the query image, pixel domain validation analysis compares image textures (i.e., how well the pixels in the planes match the query image after the warping function is performed). There are two main benefits to that approach. First, when the number of matching feature descriptor pairs between the query image and a plain is small, the chance of false random match is not insignificant, but can be readily eliminated by comparing the image textures. Second, even when the number of matching feature descriptor pairs between the query image and a plain is large, it is difficult to determine the correct plane out of two similar looking planes in different locations using only the matching feature descriptor pairs, since they are subject to inconsistency of feature selection. In contrast, pixel domain validation analysis can be more accurate by considering the image textures (i.e., all pixels available) without resampling.

In one example, pixel domain validation analysis is performed as follows. First, for all planes that were selected based on the geometric analysis of the matching feature descriptors, the control unit 72 computes the following normalized texture:

$$I'_i = \mu_q + \frac{\sigma_q}{\sigma_i}(H^{-1} \cdot I_i - \mu_i) \quad (3)$$

where $I_i'$ is the texture for the plane Pi, $\mu_i$ and $\sigma_i$ are respectively the mean and variance of the plane, and $\mu_q$ and $\sigma_q$ are the mean and variance of the corresponding region in the query image Iq. This normalization is performed for each of the three color channels, which are chosen to be in the RGB color space to minimize correlation. The normalization is required to account for differences in illumination, color, intensity viewpoint, camera specifications, etc. between the query image and the planes. The control unit 72 can use different methods for computing the texture of the planes (e.g., structured approach, statistical approach, etc.).

Next, the control unit 72 compares the Euclidean distance between the aligned pixels of $I_i'$ and Iq (i.e., between the texture of the plain and the texture of the query image). At step 350, the control unit 72 determines a second matching score based on the pixel domain validation. If the geometric analysis of the matching feature descriptors identified only one plane for pixel domain validation analysis, pixel domain validation is only performed for that plane. If, however, more than one plane from the plurality of planes stored in the memory is selected based on the geometric analysis of the matching feature descriptors, the control unit 72 determines a second matching score for all these planes based on the pixel domain validation. In one example, the second matching score for each selected planel Pi is computed as the ratio of matched image textures (i.e., pixels) to non-matched image textures $R_t \in (0, 1$.

Based on the second matching score, the control unit 72 matches the query image Iq to at least one of the planes (by going to step 210). For example, the control unit 72 can select the plane with the highest second matching score from the plurality of planes that were analyzed using pixel domain validation to match the query image to that plane. Next, the control image determines a location based on the plane (by going to step 215). As described above, the control unit 72 can retrieve the plane location associated with the selected matching plane from the memory 80 and can send the location (e.g., as a portion of the building's map pointing to the location) to the users mobile device 30. Therefore, in one example, comparing the query image to the plurality of planes stored in a memory includes both executing a warping function and performing a pixel domain validation analysis. Further, matching the query image with at least one of the plurality of planes is based on the warping function (by selecting at least one plane for further analysis) and the pixel domain validation analysis. By executing these steps, the system 20 offers a robust image-based localization method for determining a location.

In some examples, after pixel domain validation analysis is performed, the control unit 72 determines that there are multiple high second matching scores (i.e., multiple planes with similarly high scores). If the multiple high second matching scores point to the same location on the map of the environment that is not an issue. However, in some example, the multiple high second matching scores can point to different locations of the environment. Therefore, the control unit 72 cannot determine one specific location on the map of the environment saved in the memory 80. This can happen in highly repetitive environments, such cubicles in office buildings. In step 360, the control unit 72 determines a whether there are multiple high second matching scores based on the pixel domain validation that "disagree" or point to different locations. If there are no multiple high second matching scores that point to different locations, the control unit 72 proceeds to steps 210 and 215 to match the query image Iq with least one of the planes by selecting the plane with the highest second matching score and to determine a location based on the matched plane.

On the other hand, when the control unit 72 determines that there are multiple high second matching scores pointing to different locations based on the pixel domain validation, the control unit 72 computes a weighted score and uses the weighted score to compute a refined second matching score to determine a location of the query image (at step 370). Generally, planes in different locations that have similarly high second matching score have similar image textures. Having similar image textures makes it difficult to determine which is the correct plane that matches the query image. Therefore, in one example, a weighted score is computed by reducing the weight of the similar textures. For example, two cubicle walls may be identical except for a small region containing different name plates. A more discriminating or defined score can be computed by applying a smaller weight to the common image texture of the planes.

Specifically, given a set of planes $\{\hat{P}_1\}$ (i.e., at least two planes) that has a high second matching score, the control unit 72 computes normalized textures $\hat{I}_t^i$ for the set of planes and compares that to the textures of the query image Iq. In one example, the control unit 72 counts the number of times each pixel in the query image Iq scores a match. The final per pixel weight ω for each pixel (x, y) of the query image Iq is computed as a logistic function of the pixel count Cx,y:

$$\omega(x, y) = 1 - \left(1 + e^{-\frac{C_{x,y}-a}{b}}\right)^{-1} \quad (4)$$

where a and b are constants that control how fast weights drop off as Cx,y increases with normalization so that ω=1 when Cx,y≤1. In one example, a and b can be 4 and 0.6, respectively. However, other parameters or other weight functions can be adopted for different application needs. Finally, a refined second matching score is computed as:

$$\hat{R}_i = \frac{\sum_{x,y} \omega(C_{x,y}, k) \cdot 1_{\tau_e}(x, y)}{\sum_{x,y} \omega(C_{x,y}, k)} \quad (5)$$

where $1_{\tau_e}(x, y)$ is an indicator function provided by:

$$1_{\tau_e}(x, y) = \begin{cases} 1, & \text{if } |\hat{I}_i'(x, y) - I_q(x, y)| < \tau_e \\ 0, & \text{otherwise.} \end{cases}$$

Therefore, the control unit 72 uses the computed weighted score to further compute a refined second matching score using the ratio of matched image textures (i.e., pixels) to non-matched image textures. Based on the refined second matching score, the control unit 72 proceeds to steps 210 and 215 to match the query image Iq with least one of the planes by selecting the plane with the highest refined second matching score and to determine a location based on the matched plane.

The control unit 72 is also operable to automatically update the plurality of planes in the memory 80 based on the matching the query image with at least one of the plurality of planes. For dynamic indoor environments (offices, schools, etc.), it is common for objects to be rearranges, added, or removed, which makes a scene (i.e., a plurality of planes) to differ from the original scene with the original planes stored in the memory. Instead of frequently reimaging the indoor environment and uploading new planes to the memory 80, the control panel 72 automatically updates the datacenter 125 can be updated by using the matching query images.

In one example, the control unit 72 keeps a count for each pixel in every plane stored in the memory 80 (i.e., pixel resolution). When a plane is chosen as the matching plane to the query image, the control panel 72 updates the count for its pixels by giving a high score for matching pixels between the plane and the query image, and a low score for mismatched pixels. In such a way, if a sub-region (i.e., a plane in a location) of an environment has changed since the last imaging of the environment, the count for this changed region in a plane would be smaller than the count for the other parts of the plane. After receiving a smaller count from multiple query images, the changed region would generally have a sizably smaller count.

In one example the described method is implemented as follows. First, the control unit 72 increases the count of a plane by δ1 if a pixel of the selected plane matches a pixel in the query image, and by δ2 (δ1>δ2) if the pixel is mismatched in the query image. After a plane has been matched to a number of query images by the system 20, the control panel 72 examines the distribution of count in that plane to detect if objects have been removed. If a pixel's count value is significantly smaller than the other pixels in a plane or smaller than an average of count values for a plane, the control unit 72 determines that the pixel is moved and that pixel is not considered for future matching. This information about the pixel's count value is propagated to all other planes with the same location. Through homography mapping between different planes, the corresponding pixels can be located and updated accordingly.

Therefore, the proposed systems, methods, and instructions stored in non-transitory machine-readable storage medium, offer a robust real time method for image-based localization. The proposed methods can determine a location based on a query image captured with a mobile device regardless the camera pose or focal length even in a repetitive indoor environment that includes similar characteristics.

What is claimed is:

1. A method performed by a system, the method comprising:
    comparing a query image received from a mobile device with a plurality of planes stored in a memory, wherein each of the plurality of planes is a planar region of an imaged area of an environment;
    matching the query image with at least one of the plurality of planes; and
    determining a location of the mobile device based on the matching of the query image with the at least one plane without using non-planar structures in the query image,
    wherein comparing the query image with the plurality of planes includes executing a warping function between the query image and the plurality of planes to determine at least a first matching score for matching the query image with the at least one plane.

2. The method of claim 1, wherein the plurality of planes is generated from a plurality of images, each image corresponding to a location in an environment, and each plane being associated with the location.

3. The method of claim 1, wherein comparing the at least one query image with the plurality of planes further includes performing pixel domain validation analysis.

4. The method of claim 1, wherein executing the warping function includes geometric analysis of matching feature descriptors between the query image and the plurality of planes to determine the first matching score for matching the query image with the at least one plane.

5. The method of claim 4, wherein comparing the query image with the plurality of planes further includes selecting at least one plane from the plurality of planes stored in the memory for pixel domain validation based on the geometric analysis of the matching feature descriptors.

6. The method of claim 5, wherein the pixel domain validation includes comparing an image texture of the query image with an image texture of the at least one of the planes selected based on geometric analysis of the matching feature descriptors.

7. The method of claim 6, wherein comparing the query image with the plurality of planes further includes determining a second matching score based on the pixel domain validation, when more than one plane from the plurality of planes stored in the memory is selected based on the geometric analysis of the matching feature descriptors.

8. The method of claim 7, wherein matching the query image with at least one of the plurality of planes further includes selecting a plane with a highest second matching score from the planes selected based on geometric verification to determine the location of the query image.

9. The method of claim 8, further comprising computing a weighted score when there are multiple high second matching scores based on the pixel domain validation and using the weighted score to compute a refined second matching score to determine a location of the query image.

10. The method of claim 8, further comprising automatically updating the plurality of planes in the memory based on the matching of the query image with the at least one plane.

11. A system comprising:
    a computing device including a control unit to
        receive a query image acquired by a mobile device,
        compare the query image to a plurality of planes stored in a memory by executing a warping function and performing a pixel domain validation analysis, wherein each of the plurality of planes is a planar region of an imaged area of an environment,
        match the query image with at least one of the plurality of planes based on the warping function and the pixel domain validation analysis by computing a first matching score and a second matching score, and
        determine a location of the mobile device based on the matching of the query image with the at least one plane without using non-planar structures in the query image.

12. The system of claim 11, wherein the control unit is to perform geometric analysis of matching feature descriptors between the at least one query image and the plurality of planes in order to execute the warping function, and the control unit is to identify at least one plane for pixel domain validation analysis based on the geometric analysis of matching feature descriptors.

13. The system of claim 12, wherein the control unit is to compare a texture of the query image with a texture of the at least one plane identified for pixel domain validation analysis.

14. The system of claim 11, wherein each plane is stored with at least image texture information and plane location information, and the control unit is to determine feature descriptors for each plane based on the image texture information.

15. A non-transitory machine-readable storage medium encoded with instructions executable by a processor of a system, the machine-readable storage medium comprising instructions to:
    construct a plurality of planes from a plurality of images and store the planes in a memory, wherein each of the plurality of planes is a planar region of an imaged area of an environment;
    process a query image received from a mobile device and identify feature descriptors of the query image;
    compare the query image with the plurality of planes by using geometric analysis of matching feature descriptors between the query image and the plurality of planes;
    identify a match between the query image and at least one of the plurality of planes;
    compute a matching score for the match between the query image and the at least plane by performing pixel domain validation; and
    determine a location of the mobile device based on a highest matching score without using non-planar structures in the query image.

16. The non-transitory machine-readable storage medium of claim 15, wherein performing pixel domain validation includes comparing an image texture of the query image with an image texture of the at least one plane selected based on geometric analysis of matching feature descriptors.

17. The non-transitory machine-readable storage medium of claim 15, further comprising instructions to compute a weighted score when there are multiple matching scores based on the pixel domain validation and to use the weighted score to compute a refined matching score to determine a location of the query image.

* * * * *

UNITED STATES PATENT AND TRADEMARK OFFICE
CERTIFICATE OF CORRECTION

| | | |
|---|---|---|
| PATENT NO. | : 9,075,826 B2 | Page 1 of 1 |
| APPLICATION NO. | : 13/895500 | |
| DATED | : July 7, 2015 | |
| INVENTOR(S) | : Ju Shen et al. | |

It is certified that error appears in the above-identified patent and that said Letters Patent is hereby corrected as shown below:

Claims

In column 15, line 33, in Claim 1, delete "at least a" and insert -- a --, therefor.

In column 15, lines 39-40, in Claim 3, delete "the at least one" and insert -- the --, therefor.

Signed and Sealed this
Twenty-sixth Day of January, 2016

Michelle K. Lee
*Director of the United States Patent and Trademark Office*